Feb. 5, 1935.  L. L. CUNNINGHAM  1,989,972
PROPORTIONING CONTROL SYSTEM
Filed May 8, 1931  4 Sheets-Sheet 1
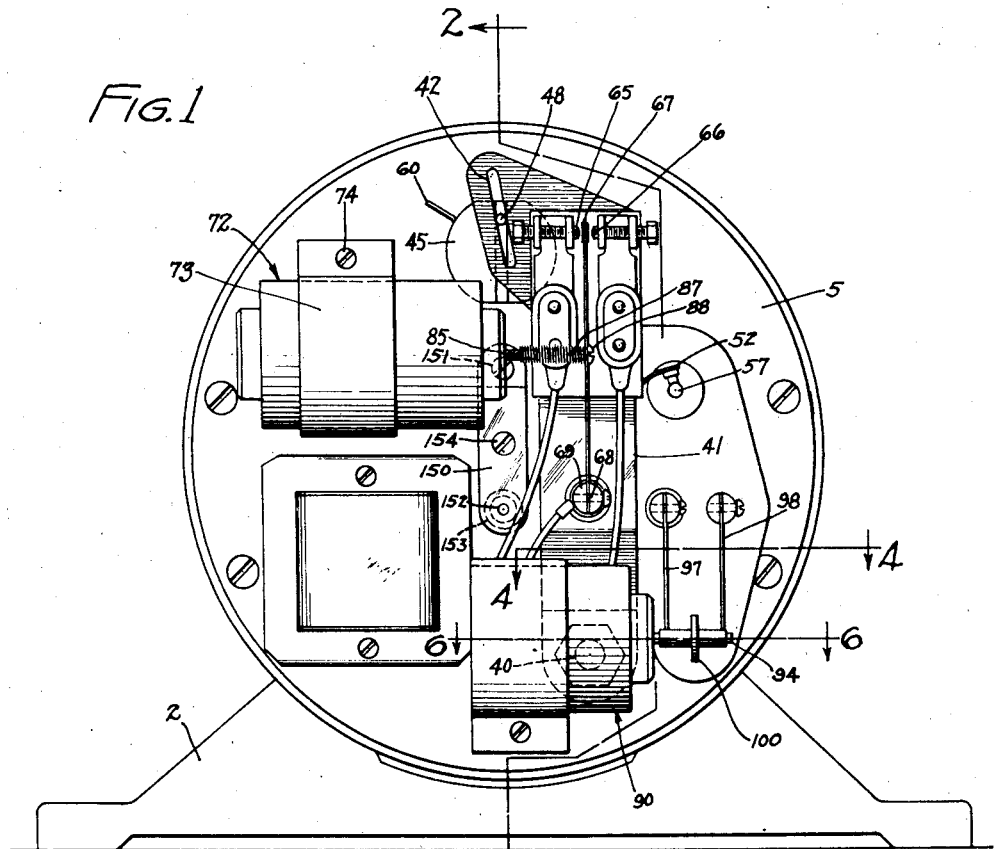
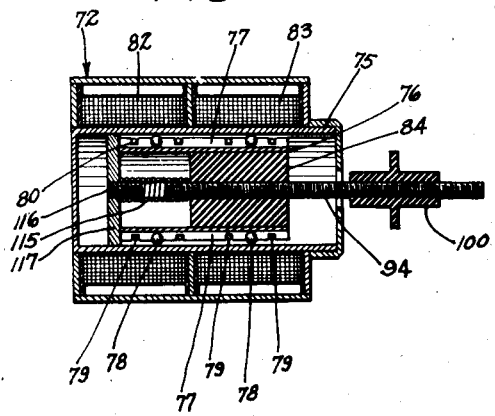
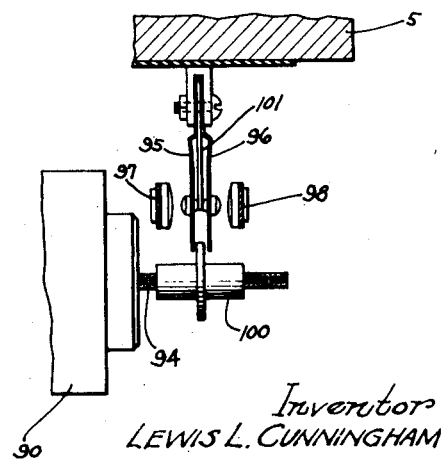
Inventor
LEWIS L. CUNNINGHAM
ATTORNEYS Feb. 5, 1935. L. L. CUNNINGHAM 1,989,972
PROPORTIONING CONTROL SYSTEM
Filed May 8, 1931 4 Sheets-Sheet 3

Inventor
LEWIS L. CUNNINGHAM
By Paul, Paul & Moore
ATTORNEYS

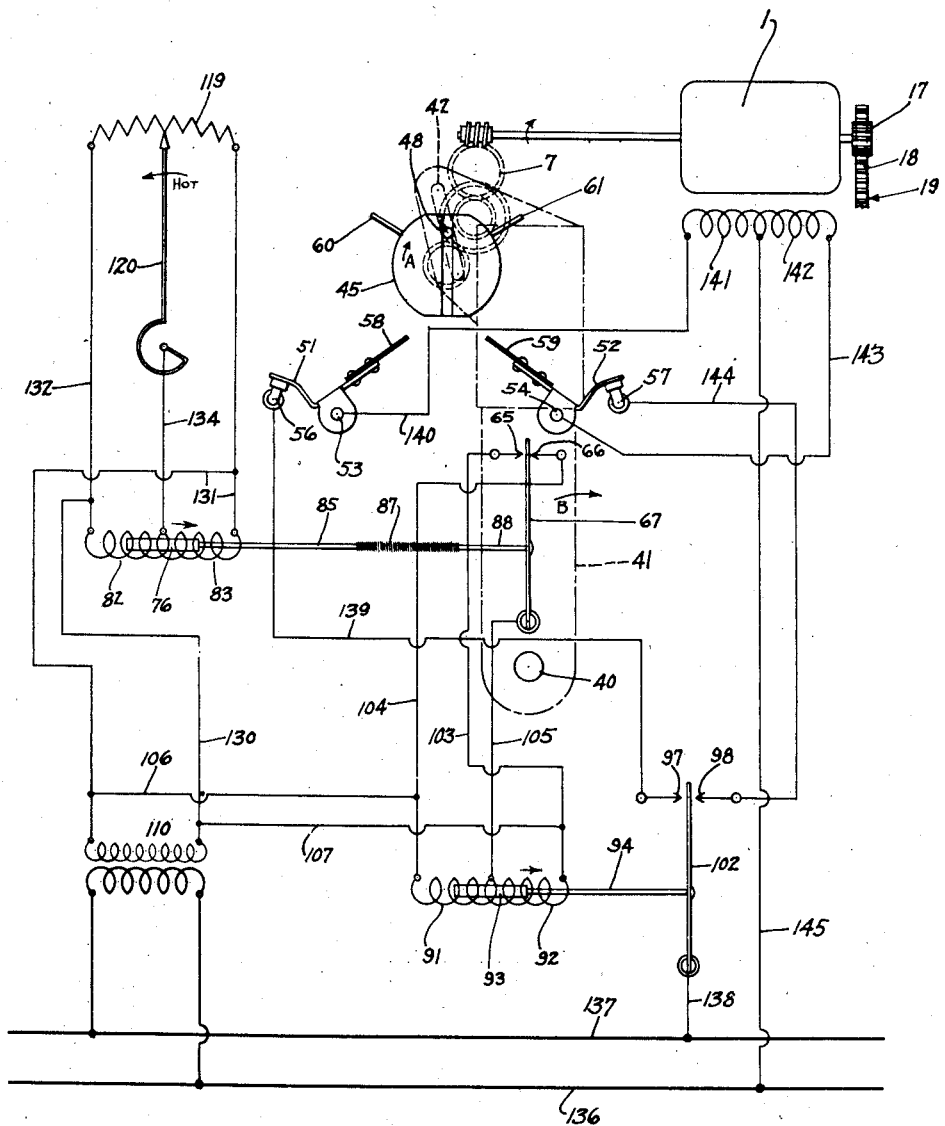

Patented Feb. 5, 1935

1,989,972

UNITED STATES PATENT OFFICE 1,989,972

PROPORTIONING CONTROL SYSTEM

Lewis L. Cunningham, Minneapolis, Minn., assignor to Minneapolis-Honeywell Regulator Company, Minneapolis, Minn., a corporation of Delaware Application May 8, 1931, Serial No. 535,886

21 Claims. (Cl. 172—239)

This invention relates to improvements in regulating systems and has, among its objects, to provide a mechanically perfected instrument for such purpose, and particularly an instrument in which the control can be accurately accomplished by the use of a switch having contacts alternatively controlled, and in which the circuits are constantly very near the making or breaking points, and in which the making and breaking is accomplished by slow motion, as distinguished from rapid motion, or "snap" action.

This invention is also particularly valuable for use with certain types of controlling instruments which, as they approach the point at which their effects are to be transferred their force and/or degree of motion closely approaches zero. The control instrument may be any delicately balanced instrument such as a weighing scale, wherein it is desirable to have the scale perform some control function at or near its balancing point and when the force exerted for control must of necessity be very small in order avoid the production of a condition of unbalance. This particular control device includes, among its purposes, the utilization of unbalance of resistances or more generally the unbalance of impedances to do useful work.

Features of the invention relate to the mounting of switching means on a movable support, and to the provision of means for operating the switching means to close the switch and then moving the support in direction in which the contact is made, to break the contact; to the provision of electrically operable means for operating the switch arm and for moving the support in a predetermined relation to the motion of the switch arm; to the provision of a connection between the switch-operating arm and the means for operating it, which is yieldable in direction of application of operating force; to the provision of electrically controllable devices and means for controlling them alternatively, including contacts and means for alternatively controlling them, along with circuit connections by which sparking is reduced to a minimum during breaking of either contact; to the provision of a perfected movable core-solenoid, in which the core is balanced for great sensitivity to magnetic action; to the provision of a solenoid movable core construction having means for yieldably retarding the action in both directions; and generally to the provision of a mechanically perfected system usable for controlling many kinds of physical conditions.

Features of the invention also include all the details of construction of the device shown; the arrangement of the devices in the system; the connecting elements between the devices; and combinations and sub-combinations of the parts.

Objects, features and advantages of the invention will be set forth in the description of the drawings forming a part of this application, and in said drawings:

Figure 1 is an end view of the control system as applied to a motor, and showing the construction and arrangement of the switching units and means for operating them;

Figure 4 is a detail plan section taken approximately on line 4—4 of Figure 1, illustrating the motor reversing switch and operating means;

Figure 6 is a detail section of the solenoid taken substantially on line 6—6 of Figure 1 illustrating the dash-pot construction;

Figure 8 is a diagrammatic view of the control system.

Figure 2:
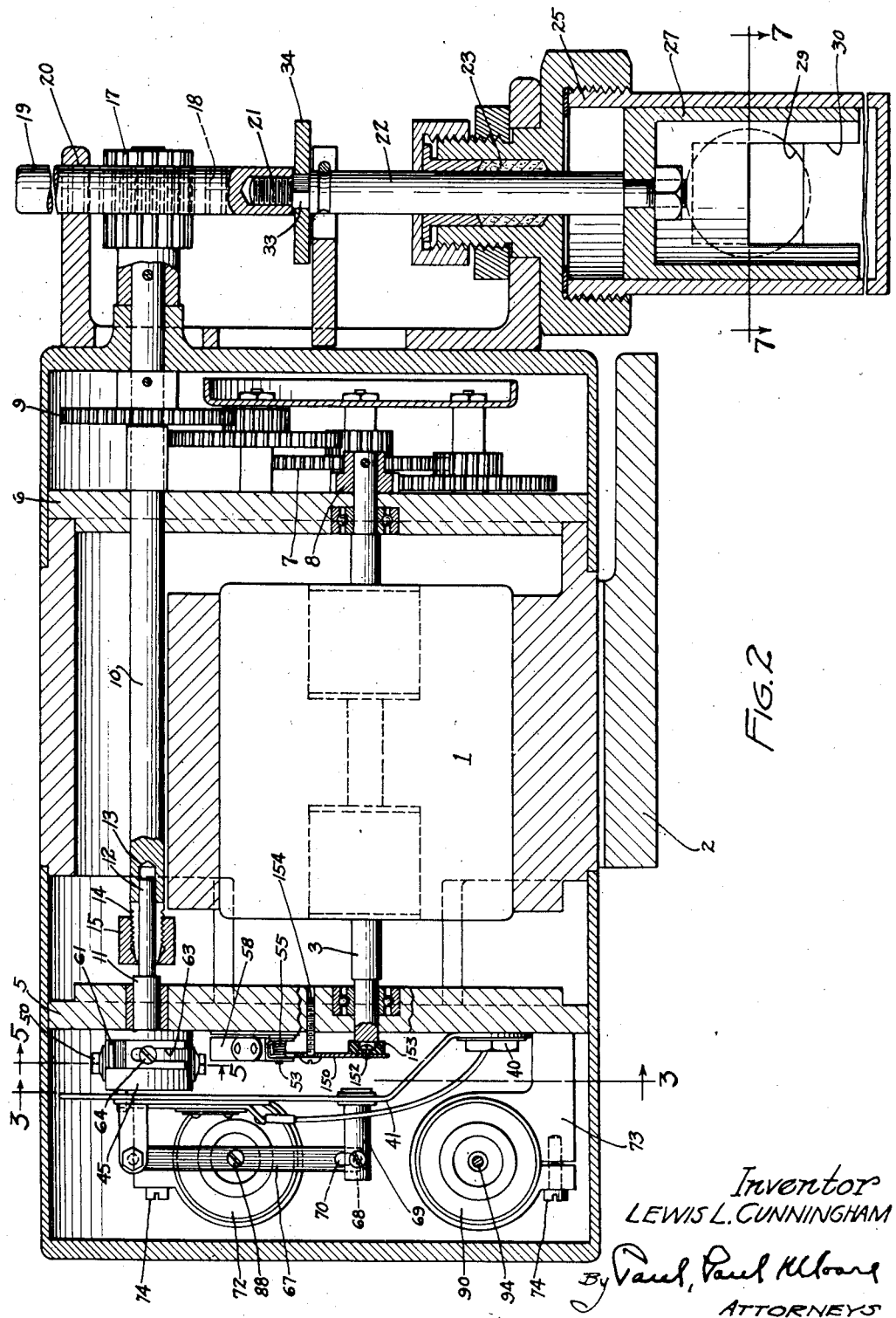
Figure 2 is a vertical longitudinal section substantially on line 2—2 of Figure 1 showing the driving means between the motor, and the energy control member or valve, and the means for moving the switch support.
Figure 7:
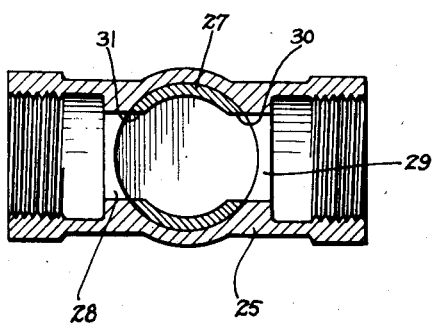
Figure 7 is a plan section through the valve on line 7—7 of Figure 2.

Referring first to Figures 1 and 2: A feature of the invention is the control unit as shown. This unit includes a reversing motor 1 of any approved type mounted on a suitable base 2 and having the usual rotor shaft 3. At the opposite ends of the motor casing are arranged plates 5—6 as supports, upon which are respectively arranged switching mechanisms, and speed reduction gearing. The reduction gearing is generally indicated at 7 and may be of any approved type. One of the terminal gears 8 is attached to the shaft 3 and the other terminal gear 9 is attached to a master shaft suitably journaled in the plates 5 and 6 and, in this instance, composed of two sections 10 and 11, the section 11 having a reduced portion 12 fitting into a socket 13 of the section 11. The end of the shaft section 10 is split, and the shaft is threaded as at 14 and a nut 15 acts to constrict the split portion to couple the sections 10 and 11 for rotation in unison. This form of union permits angular adjustment of either shaft section relative to the other. At one end of the shaft section 10 is secured a gear 17 in mesh with a rack 18, of a stem 19 journaled at one end as at 20 for longitudinal movement, and at the other end having threaded connection as at 21 with a valve stem 22 which stem passes through a stuffing box 23 of the valve casing generally indicated at 25. Within the casing and suitably connected for rotation with the stem 22 is a valve 27, also see Figure 7, controlling valve ports 28—29. This valve is symbolic of means for controlling the delivery of energy, and, in this instance, the energy controlling device is a proportional flow valve. The hollow cylindrical port-controlling element 27 is provided with lateral openings 30—31 which establish communication with the ports 28—29. The opening and closing of the valve, see Figure 2, is, in this instance, obtained by a vertical or axial adjustment by means of gear 17. The threaded connection 21 permits an angular or rotative adjustment of the valve 27 to vary the volume of flow. The shaft 22 is squared as at 33 and a thumb nut 34 engages this squared portion as a means to rotatably adjust the element 22 relative to the element 19. There is no intention to limit the broader aspects of the invention, to the use of a valve, yet this valve is a feature of the system, and of the motor unit.

Figure 5:
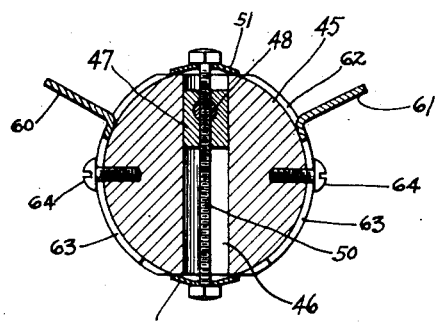
Figure 5 is a detail section through the support-adjusting and switch-operating means, taken substantially on line 5—5 of Figure 2.

Pivoted as at 40 (see Figure 2) on the outer face of the support 5, is a switch-supporting plate 41 which is bent to provide a portion spaced away from the face of the support 5. Referring to Figure 1, this portion of the plate has at its top a slot 42, the long axis of which intersects the pivotal axis 40. Means is provided for adjusting this plate 41 by means of motor movement through shaft 11, and to this end the shaft is provided with a crank head 45 which lies between the plate 41 and the support 5, see Figures 1, 2, 3 and 5. Referring particularly to Figure 5, this head has a diametric slot 46, in which a crank pin block 47 is slidable. The crank pin 48 is carried by the block and is slidable in the slot 42, see Figure 1. The block 47 is adjustable by means of screw 50 which is disposed in the slot 46 and is journaled in plates 51 respectively engaging opposite sides of the periphery of the head 45, see Figure 5. By this means, the crank pin can be adjusted relative to the axis of rotation of the head 45.

Figure 3:
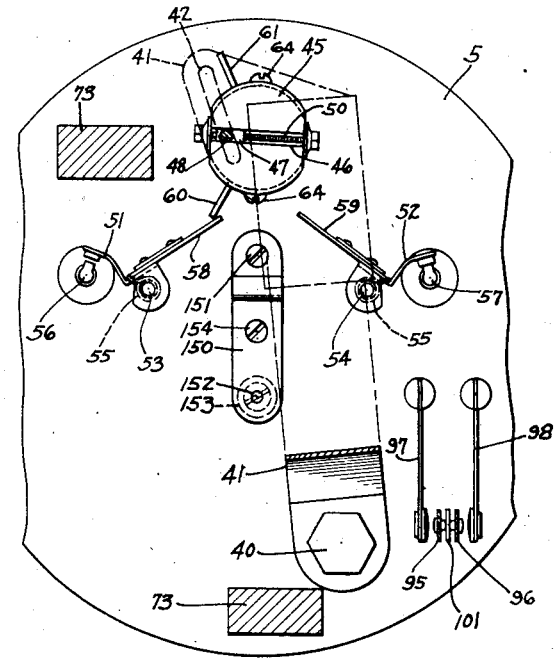
Figure 3 is a view corresponding to Figure 1 with certain parts removed and taken on a plane substantially represented by line 3—3 of Figure 2, illustrating the switch support moving means and limit switches operable thereby.

This head is also provided with means for operating limit switches adapted to break the motor circuit and prevent continued motion of the head in a given direction, and, therefore, of the plate 41. These switches are best shown in Figure 3, and include movable contactors 51—52 respectively pivoted at 53—54 and each switch has a spring 55 by which it is biased to move to closed position against the corresponding contact. These contacts are indicated at 56—57. The switches have extensions respectively indicated 58—59 formed of insulating material. Referring to Figure 5, the head has adjustable arms respectively indicated 60—61 slidable in a circumferential groove 62. Each arm is slotted as at 63, (see Figure 2) and a set screw 64 passes through the slot of each to clamp the arm in any adjusting position. The elements 60—61 are, therefore, angularly adjustable with reference to the axis of rotation of the head 45 and as shown in Figure 3, each arm is adapted to control one of the switches. In Figure 3, arm 60 is shown holding switch 51 open and it is evident that on sufficient rotation of the head in clockwise direction from the position shown, switch 51 will first be released, for closing and on continued rotation arm 61 will engage arm 59 and open switch 52. Thus the head 45 not only controls the limiting switches for the motor, but also controls the movement of the support 41. It is conceivable that head 45 could control means other than switches, for controlling motive means other than an electric motor.

A feature of the invention is the mounting of a switching device upon a movable support 41, which switching means herein includes (see Figure 1) two adjustable contacts respectively indicated 65—66, and a resilient or flexible blade 67 operating between the contacts, or adapted to alternatively control the contacts. This flexible and resilient blade is held at one end as at 68 by a stud 69, which is, in turn, mounted upon the plate 41, see also Figure 2, and the blade is slotted as at 70 and is suitably held by a screw so that it is adjustable in a lengthwise direction. The stud 69 is adjacent the pivotal axis 40 of the plate 41.

A feature of the invention includes a solenoid having a movable core, with yieldable connections between the core and the resilient switch operating element 67, the connection being made at a point intermediate the contacts 65—66 and the point of connection 68 of the flexible element 67 with the plate 41. The solenoid is so constructed as to be very sensitive and its axis is horizontally disposed. The construction of the solenoid per se including the ball-bearing supported core, is also a feature of the invention. Referring to Figure 1, the solenoid is generally indicated at 72 and it is mounted for adjustment axially and in direction of motion of the flexible blade 67. This is a feature.

The support for the solenoid 72 is indicated at 73, and the support is capable of circumferentially clamping this solenoid, and is releasable by means generally indicated at 74. Two solenoids 72, 90, are used in the system and each is supported for axial adjustment. Solenoid 90 has a dash-pot associated therewith, which dash-pot construction is illustrated in Figure 6. The two solenoids are identical with the exception of the dash-pot construction, and the construction of the solenoid 72 can be understood by reference to Figure 6. Each solenoid has a tubular member 75 in which a tubular core 76 is movable. A series of slots 77 extending longitudinally of the periphery of the tubular member 76 are provided, as ball races, and suitable ball bearings 78 are arranged in these slots, and are limited in their movement by pairs of circumferential wires 79 received by circumferential grooves 80. The axis of each solenoid is horizontally disposed and this, with the anti-friction devices, assures a sensitive response to the magnetic influence of the coils (coils 82—83 for solenoid 72, and coils 91—92 for solenoid 90) surrounding the tubular member 75. A casing houses the coils and this casing is adjustably held on mount 73. The tubular core-housing element 75 is closed by a removable cap. The coils 82—83 have substantially the same electrical characteristics and form one side of what may be termed an inductance-resistance bridge, see Figure 8. The resistance 119 may be considered a potentiometer, controlled by means in this instance of a thermostatic device 120 to, in turn, control the electrical effects in the solenoids 82—83, to obtain alternative motions of the core.

Within the tubular element 76 is a plug 84, and in threaded connection with this plug is an axially arranged threaded stem. The stem for solenoid 72 is designated 85, and stem for solenoid 90 is designated 94. Stem 85 forms part of the connecting means between the core 76 and the flexible switch control element 67. Thus far, the construction of the two solenoids are identical and the description of one will suffice for both. The dash-pot construction is described herebelow.

Referring to Figures 1 and 8: Attached by one end to the rod 85 (which is adjustable with reference to the core by rotation) is, in this instance, a delicate spring 87, the opposite end of which is attached to the threaded portion of a screw 88 carried by the flexible control element 67. In this instance, the pitch of the spring coils is so related to the pitch of threads of the screw that the spring can be adjustably attached in the manner of a nut to the elements 85—88. The ends of elements 85—88 are, of course, spaced as shown. This yieldable arrangement compensates for motions between the plunger and the resilient element 67, and between the plunger and the movements of the support 41, and is a valuable feature of the invention, particularly in this device wherein motion of the element 67 between the contacts 65—66 is very small and in which the circuit is opened and closed by a slow motion of the support-carrying element 67, as distinguished from the conventional snap action switches.

The contacts 65—66 are threaded into suitable supports which are, in turn, mounted on a piece of insulation secured to the plate 41. Suitable conducting elements shown in Figure 8 and described under the heading "Operation" connect these contacts with a second double-coil solenoid (or suitable magnetically operable device) and a center tap wire from this double coil solenoid connects with the flexible control element 67. By this means, the reversing switch for the motor is controlled, the motion of the element 67 being in turn delicately controlled by the inductance resistance bridge device previously referred to, or by an equivalent device.

The mechanical relations of the solenoid or equivalent device, connection 87, pivotal point 40 of the plate and contacts and blade 67, as well as the mounting of the contacts 65, 66, 67 on a movable support, are among important features of the invention.

By mounting the contact blade 67 on the plate, in the manner shown, the blade is always substantially parallel with a line passing midway between the contacts 65—66, and cutting axis 40, and only a minimum flexing of the blade can occur. If this contact blade were supported independently of the plate on which the contacts 65—66 are supported, the blade would, on motion of the plate, have to flex more.

One of the objections to the use of the usual switch arm is that a pivot has to be provided for the arm and this pivot has to be so designed as to properly carry current and a "pig tail" had to be used to electrically connect the pivot in the circuit.

The use of the connection 87 is a valuable feature. With it, there is no difficulty in getting the proper alignment between the plunger and the blade. The contact blade swings about a center, whereas the motion of the plunger is rectilinear, so that a flexible or universal joint is necessarily used to compensate for the difference between the two motions. In addition, if a rigid or non-yieldable connection is used between the plunger and the contact blade, it is found that the blade when engaging either contact has a marked tendency to vibrate, particularly when the pressure is light, with the result that there is a good deal of sputtering, whereas when the spring connection is used, this tendency to bounce is almost entirely eliminated. With the use of alternating current, the plunger has a tendency to vibrate. It is this tendency to vibrate that causes the sputtering or bouncing of the contacts, when rigid connection is used between the solenoid plunger and the contact blade. The bouncing tendency becomes greater as the force of contact approaches zero. By using a spring, the force of the blow of the contact is lessened. Thus, the coil spring may be viewed as acting as a shock absorber, as well as a compensator for differences in degrees and directions of the motion of the parts.

It is conceivable that the control instrument, or thermostat may have a sudden movement from one control position to another, and in this instance the plunger is moved suddenly to such a distance as will bring the mechanical center of the core in opposition to the magnetic center of the coil. Inasmuch as this motion is sudden the spring connection will either be compressed or stretched according to the direction of motion and this compression or tension will be relieved during motion of support 41.

Before connecting the core with the blade, the blade is arranged between the contacts and then the contacts are backed off so that neither engages the blade. I then energize the solenoids 82—83 independently of the resistance 119. Then axially adjust the solenoid to approximately the desired position, and operate the motor until the plate 41 is midway of its extreme motion positions. Then attach the spring 85, then cut to approximately the right length. Then screw the spring onto the element 88 after insertion of 88 through the opening in the contact blade. Then adjust the solenoid in its support to relieve the strain on the spring.

In this device, the axis of the solenoid is horizontally disposed, and the solenoid has little work to do because of the arrangement of the parts 41, 65, 66, 67. In explanation: Consider the case in which the solenoid axis is vertical. In such a case, there will be a tendency for the center of mass of the solenoid to remain below the magnetic center when the solenoid is energized. Now, if the supply voltage is varied, for example increased, the plunger will more nearly approach magnetic center, and if the voltage is decreased, the plunger will "sag" farther away from the magnetic center. In the present device, if the plunger had to exert very much force to flex the spring 67, or to move any switch arm, (as would be the case if the spring or arm were not mounted to move bodily with the support 41), then more force would be required to cause the center of mass of the core to coincide with the magnetic center. If such a disturbing force is present, then the mechanical center of the plunger will less nearly coincide with the magnetic center.

In the present device, whatever be the point at which the core is disposed, there is very little force required for its proper operation, whatever the position of the core.

The switch including elements 65, 66 and 67 controls a double coil solenoid which, in turn, controls the reversing switch for the motor. This solenoid is adjustably supported and is generally indicated by numeral 90. It is composed of two coils 91—92 having substantially the same electrical characteristics, and suitable electrical connections are provided by means of which the switch 65—66—67 can control coils 91—92 to obtain alternate motions, or motion by increment in the same direction of the core 93. This core 93 operates, by means of element 94, to control motor reversing contacts 97 and 98, in this instance through two switch arms, see Figure 4, respectively indicated at 95—96, which arms are biased to move against an element 101, as a stop spacing the arms. In Figure 8, the elements 95—96 are represented by a single element 102 with which the element 94 is connected. The single element is shown as operating between the contacts 97—98. The illustration in Figure 8 suggests that the motor reversing switch could have the same construction as the switch which includes the elements 65, 66 and 67.

The manner of making circuit connections between 65, 66, 67 and 91, 92 including the power source 110, is a feature of the invention.

Here, the switching action fundamentally differs from the usual practice. Ordinarily, circuits should be opened or closed quickly in order to reduce arcing to a minimum. In the present device, it may be said that this fundamental principle of quickly making and breaking is violated because, in this system, this making and breaking is accomplished by slow motion of the switch control member. Therefore, a feature of this invention includes the application of power to the electric bridge (which includes the two contacts 65—66, the element 67 movable therebetween, and the two coils 91, 92) in such manner that these coils are operated in series relation to the power. By this means, the sparking on opening the circuit at either contact is reduced to a minimum. This arrangement is to be distinguished from that in which the power is so applied that the coils are operated in parallel relation, under which conditions there is always an inductive kick when the circuit is opened at the contacts, which materially increases sparking which is particularly undesirable in the present device. The connections are as follows: Contact 65 is connected to the free end of coil 92 by conductor 103, and contact 66 is connected by conductor 104 to free end of coil 91. Element 67 is connected by conductor 105 directly between the series-connected coils 91, 92. The power 110 is connected on one side by conductor 106, to 104, and on the other side by conductor 107 to 103. Thus, the coils are normally operated in series with respect to the power supply. The coils 91 and 92 are alternately energized, as a result of alternate closing of contacts 66, 65 by arm 67.

The structure of the motor reversing switch and of the dash-pot solenoid for operating it are respectively shown in Figures 4 and 6. On the element 94 is an insulating sleeve 100 which has a flange or projection extending between the arms 95—96. On movement of the solenoid core in appropriate direction, an arm is moved to switch-closed position. The element 100 is in threaded connection with the element 94 and can, therefore, be adjusted by rotation.

Referring to Figure 6, and to the dash-pot construction: The element 94 corresponding to element 85 has attached thereto one end of a spring 115, the opposite end of which is connected to a threaded stud 116 of a dash-pot disk 117, which somewhat loosely fits in the tubular member 75 in a manner to obtain a dash-pot action. By this construction the motions of the core are yieldably retarded in both directions. The flexible connection or spring 115 is used to make the disk self-centering.

The contacts 97—98 are adapted to control the motor by a suitable circuit shown in Figure 8, in which circuit limit switches are so arranged as to be controlled by the arms 60—61 to break the motor circuit and properly limit motion of support 41, in both directions. The electrical connections by which the solenoids 91—82 are controlled may be said to form with the contacts 65, 66 and 67 an electric bridge somewhat analogous to that formed by the connections for the solenoids 82—83 which are controlled by the potentiometer winding 119 by means of motion of thermostat 120. The element 120 may be any suitable device which can respond to a change in physical conditions. The main difference between the character of the operation of coils 82—83 and that of coils 91—92 is that in the first instance, a gradual motion of the core 76 may be obtained, while in the case of the core 93, it moves first to one limit position and then to the other, and does not have what may be called a graduated movement, as in case of the core 76.

It will be understood that the balanced relation of the plungers 76, 93, in their substantially friction-less mountings contributes to the practicable success of the device as a proportioning regulator, and, that, in addition, the dash-pot construction of the solenoid for operating the motor reversing contacts is an important feature in the combination. The dash-pot prevents slam in one direction and over-run in the opposite direction. The dash-pot action is obtained by the use of a self-centering piston or suction disk, of non-magnetic material such as brass.

In view of the short length of time that the contacts 97—98 remain together (in the presence of vibration which always exists) if the dash-pot is not used, there is not enough time to start the motor, before the contact opens. With the dash-pot, the contact is necessarily maintained for an appreciable time if the plunger travels to its limit. The dash-pot action results in causing the motor to run for an appreciable interval after the contact 67 is broken, so that sufficient motion of support 41 is obtained to bring the contacts 66—65 to the mid-position shown, or to that position in which the arm 76 is out of contact with both elements 66—65.

Operation

It will be assumed that the element 120 is affected by changes in temperature in the space to be controlled and that the valve element 27 controls some device, such as a pipe line ventilating apparatus, or a motor, which can modify the physical conditions in the space.

Assume a motion of the element 120 towards the left in the figure, in response to a rise in temperature. The plunger 76 moves in direction of the arrow, or to the right. The circuit is as follows: one side of the secondary 110 of the transformer, conductor 130, 132, 119, thermostat 120, 134, coil 83, 131, to the opposite side of the secondary of the transformer. The movement of plunger to the right causes arm 67 to engage contact 66 as the result of which plunger 93 moves in direction of the arrow or to the right. The circuit is as follows: one side of the secondary 110 of the transformer, conductor 107, coil 92, 105, blade 67, 66, 104, 106 to opposite side of the secondary of the transformer. The movement of plunger 93 to the right results in closure of contact 98, and the motor is energized through the following circuit: from line 136, conductor 145, winding 142 of the motor, conductor 143, contact 57 of limit switch, conductor 144, contact 98, blade 102, conductor 138, to line 137. This results in such rotation of the motor as to move the element 45 in direction of the arrow A. This motion results in motion of the plate 41 also in direction of the arrow B to move the contact 66 away from the spring arm 67, that is in the same direction that the arm 67 moved to make the contact. This results in breaking the circuit, and if the element 120 ceases motion in the same direction, the device will remain in the position with the element 67 spaced from both contacts 65—66. On continued temperature rise, the contact at 66 will again be closed, and the same cycle will be initiated, the plate 41 will move again in the same direction to withdraw contact 66 and so on until motion of the element 120 in the direction mentioned ceases.

When the motion of the element 120 takes place in the opposite direction or to the right in the figure, a reverse motion of the parts takes place, coil 82 is energized and element 76 is moved to the left, element 67 moves to the left and engages contact 65, and plunger 93 moves to the left and contact 97 is closed, and motor winding 141 is energized through the following circuit: 136, 145, 141, 140, contact 56, 139, 97, 102, 138 to 137. The motor is reversed and, therefore, the direction of rotation of head 45 and motion of plate 41. This rotation is limited by the engagement of 60 with 58 to open the limit switch. The same "inching" in the same direction may take place and the element 67 finally comes to rest, spaced from contacts 65—66, when the element 120 ceases to move.

Valuable applications of this device are to the control of ventilating louvers or valves, so that one or more of these elements can be moved slowly or quickly, regularly or irregularly in correspondence to changes of any physical nature, temperatures, pressures, etc., in either direction, or can be given a step-by-step motion. This sort of control is to be distinguished, for example, from motor-operated damper controls previously used, in which motor rotation is always in the same direction, and damper motion is continuous to either limit.

In the unit as shown, which is a feature of the invention, the valve should have certain characteristics. The construction should be such that increase or decrease of flow through the valve will be directly proportional to the opening or closing movement. This valve per se is also a feature of the invention.

A globe type valve, for example, when opened a short distance permits a certain flow through it. If opened a further equivalent distance, there will be a further increase in flow, but if the valve is progressively opened, the increment of flow proportional to the increment of opening of the valve becomes less. On initial partial opening of the valve, the eddy currents are proportionately more effective, and as the valve continues to open, they are proportionately less.

With two rectangular openings in series, as shown, the effect of control is actually twice what it would be if there were only one control orifice, and since both of these orifices are rectangular in shape, raising the piston or rotating the piston, results in practically equal increments of flow for equal increments of either lift or rotation. There are many designs of valves on the market which will give practically a straight line relation between flow and opening, but so far as I am aware, there are none of these valves which are easily adjustable as to total capacity.

There is no intention herein to limit the invention to the uni-directional motions of the various cores because by changing the connections one core may move in one direction and cause another core to move in an opposite direction. Moreover, there is no intention to limit the invention to this feature, nor to the use of center tap coils, although these details are claimed, along with the broader features of the invention.

Insofar as I am aware, this system of control differs fundamentally from any other system. In function, the system is related to pneumatic types, in that during normal operation the medium being controlled (for example heat) is not controlled in a manner to immediately move from one extreme control position to the opposite extreme, but obtains a proportioned gradual, or step-by-step control between high and low limits. For example, if used for controlling a heating plant, in turn controlled by a room thermostat, and if a temperature of seventy degrees in the room is desired, then at seventy degrees the motor will be in a mid-position and heat will be supplied at half the maximum rate. If the temperature drops slightly the motor is caused to move so that more fuel is fed and, therefore, increase of heat is obtained. On rise of temperature, the actions take place in reverse order.

In an operation of this kind, the sensitivity of the control is important. By sensitivity is meant the amount of rotation of the motor shaft or the control element 45 in response to a given amount of change of temperature or other condition under control. For example, where the normal temperature is seventy degrees, if on a drop of one-fourth of a degree the motor should move to a "three-quarter open" position, and on a further drop of one-fourth of a degree, the motor should move to "fully open" position, then the control would be considered relatively sensitive. If, however, a five degree drop were required to cause the motor to open fully, then the control would be relatively un-sensitive. The differential in the first case would be one degree, and in the latter, ten degrees, the differential being the difference in temperature required to cause the motor to move from fully closed position, or vice versa. In practice, the differential should be larger for the reason that if it is small, there is a tendency to "over-shoot". This occurs because there is usually a time lag between the admission of heat and its effect on the controlling apparatus. During this time interval, there is a cumulative effect that continues after the controlling apparatus begins to be affected by the change.

It will further be noticed that the operating differential is adjustable. The amount of response of the motor to a given change of temperature may be called the sensitivity, so that operating differential and sensitivity are directly related. Sensitivity should not be confused with speed of response. In this system, the response of the motor to a demand for change is practically immediate and extends through as great a range as is called for by the sensitive controller, and is positive.

In most apparatuses which attempt a proportionate control function, the available effort of the power unit vanishes as the control member of the power unit aproaches the position for which it is set. The result is that friction or uncompensated changes in the load on the power unit has a large disturbing effect on the resultant accuracy of operation.

Braking means acts on the end of the motor shaft 3, see Figures 2 and 3, and this means comprises a resilient element 150, connected at one end as at 151 to the plate 5. The plate has secured at its opposite end as at 152, a brake disk 153 of suitable material, which engages the end of the shaft as shown in Figure 2. The degree of frictional contact between the brake element 153 and the end of the shaft is variable by means of the screw 154 passing through 150, and threaded into the plate 5.

I claim as my invention:

1. In a control device electromagnetic means including a movable core and means for operating the electrical means to obtain alternative motions of the core, a movable support having thereon two movable contacts and a switching element movable to alternately control the contacts, an operating connection between the core and the switching element including means permitting of yielding shortening and elongation of the connection, a reversing motor, and means operable thereby for moving said support, means for reversing the motor including a switch and a movable core solenoid having its core connected for alternatively moving the switch in opposite directions, and means by which said solenoid is controlled by said contacts and switching element.

2. In a control device, a solenoid having a movable core, means for adjusting the electrical condition of the solenoid to obtain alternative motions of the core, a support movable in relation to the solenoid and having thereon two contacts and a resilient switching element adapted to alternatively control the contacts, an operating connection between the core and the switching element, including means permitting of yielding shortening or elongation of the connection, motive means, and means adapting it to move the support, and means controlled by said contacts, and controlling said motive means for moving the support.

3. A solenoid having a movable core, a movable member and contacts alternatively controlled thereby, a connection between the core and the movable member including axially aligned members secured respectively to the core and movable member and connected by means permitting of yielding shortening or elongation of the connection.

4. In a device of the class described, switching means including a resilient switch control element alternatively engageable with two contacts and adapted to be flexed during control movement, an electro-magnetically operable device having a movable core, and a connection adapting the core to operate said switch element including means permitting of yielding shortening or elongation of the connection, in direction of movement.

5. In a control device, a movable core and means for operating it to give it alternative motions, a movable support having thereon two contacts and a switching element movable to alternately control the contacts, an operating connection between the core and the switching element including means permitting of yielding shortening and elongation of the connection, motive means, and means adapting it to move the support, and means controlled by said contacts and controlling said motive means for moving the support.

6. In combination a reversing motor having reversing contacts, a flexible contact blade of metal supported at one end, contacts with which the blade may alternatively engage, a center tap solenoid including a core horizontally movable in a direction substantially perpendicular to the blade, means adapting the core for substantially friction-less motion, a fine wire coil spring connecting blade and core in axial alignment with core axis, means for electrically controlling the solenoid, means operative by the motor as it reverses for moving either contact away from the blade after making, a center tap solenoid having an armature and means for retarding armature motion in both directions, means adapting said last mentioned plunger to control the reversing contacts of the motor, and means by which the blade and contacts electrically control the last mentioned solenoid.

7. In combination, a member to be controlled, reversible motor means in control thereof, reversing switching means comprising a pivoted device having a pair of contacts and a contact arm alternatively engageable therewith, means for positioning said contact arm in accordance with the position it is desired to have the controlled member assume whereby the reversing switch means is operated to cause proper energization of the reversible motor means, and an adjustable crank arm controlled by the reversible motor means for operating the pivoted device for de-energizing the reversible motor means when the controlled member has been moved to the desired position by the reversible motor means.

8. In combination, a member to be controlled, reversible motor means in control thereof, reversing switching means comprising a pivoted device having a pair of contacts and a contact arm alternatively engageable therewith, means for positioning said contact arm in accordance with the position it is desired to have the controlled member assume whereby the reversing switching means is operated to cause proper energization of the reversible motor means, a crank arm controlled by the reversible motor means for operating the pivoted device for de-energizing the reversible motor means when the controlled member has been moved to the desired position by the reversible motor means, and limit switches operated by the reversible motor means for limiting the movement thereof in both directions.

9. A sensitive relay system, comprising, a cylinder having one of its ends closed, a pair of solenoid windings surrounding said cylinder, a cylindrical armature within said cylinder, a plunger connected to said armature and located between said armature and the closed end of said cylinder whereby the cylinder and plunger serve as a dash pot to minimize vibrations of said plunger, switching mechanism controlled by said plunger, and means for variably energizing said solenoid windings to control the position of said armature.

10. A sensitive relay system, comprising, a cylinder having one of its ends closed, a pair of solenoid windings surrounding said cylinder, a cylindrical armature within said cylinder, a plunger resiliently connected to said armature and located between said armature and the closed end of said cylinder whereby the cylinder and plunger serve as a dash-pot to minimize vibrations of said armature, said resilient connection allowing said plunger to properly align itself within said cylinder, switching mechanism controlled by said armature, and means for variably energizing said solenoid windings to control the position of said plunger.

11. A sensitive relay system, comprising, a horizontally mounted cylinder having one of its ends closed, a pair of solenoid windings surrounding said cylinder, a cylindrical armature within said cylinder, ball bearings between said armature and cylinder to minimize the friction therebetween, a plunger connected to said armature and located between said armature and the closed end of said cylinder whereby the cylinder and plunger serve as a dash-pot to minimize vibrations of said armature, switching mechanism controlled by said armature, and means for variably energizing said solenoid windings to control the position of said armature.

12. In a device of the class described, a movable support having thereon a switch control element movable to alternatively control two contacts also carried by the support, a double coil solenoid having a core and means electrically controlling the core to move it in opposite directions, means by which the plunger is connected to the switch control element, including a coil spring permitting yielding shortening and elongation in direction of the movement of the core, switch control element, and support.

13. A movable support, switching means including two contacts on the support and an arm adapted to alternatively control the contacts and attached to and movable with respect to the support, a pair of solenoids and means for alternatively operating the switch arm by said solenoids including a spring which is axially yieldable in direction of application of the operating forces, and means controlled by the switching means for moving the support away from the arm after a circuit-making engagement of the arm with one of the contacts.

14. In combination, a member to be controlled, reversible motor means in control thereof, reversible switching means comprising a pivoted device having a pair of contacts and a contact arm device alternately engageable therewith, means for positioning one of the devices in accordance with the position it is desired to have the controlled member assume whereby the reversing switching means is operated to cause the proper energization of the reversible motor means, and an adjustable crank arm controlled by the reversible motor means for operating the other of said devices for de-energizing the reversible motor means when the controlled member has been moved to the desired position by the reversible motor means.

15. In combination, a member to be controlled, reversible motor means in control thereof, reversible switching means comprising a pivoted device having a pair of contacts and a contact arm device alternately engageable therewith, means for positioning one of the devices in accordance with the position it is desired to have the controlled member assume whereby the reversing switching means is operated to cause the proper energization of the reversible motor means, and a crank arm controlled by the reversible motor means for operating the other of said devices for de-energizing the reversible motor means when the controlled member has been moved to the desired position by the reversible motor means, and limit switches operated by the reversible motor means for limiting the movement thereof in both directions.

16. A sensitive relay system comprising a cylinder having one of its ends closed, a pair of solenoid windings surrounding the cylinder, an armature within the cylinder, a disk as a dashpot element cooperable with the cylinder and connected to the armature and located between the armature and the closed end of said cylinder, switch mechanism controlled by the plunger, and means for variably energizing the solenoid windings to control the position of the armature.

17. A sensitive relay system comprising a cylinder having one of its ends closed, a pair of solenoid windings surrounding the cylinder, a tubular armature within the cylinder, a disk capping the tubular armature and resiliently connected to the armature and located between the armature and the closed end of the cylinder and serving as a dashpot, switch mechanism controlled by the plunger and means for variably energizing the solenoid windings to control the position of the armature.

18. A sensitive relay system comprising a cylinder having one of its ends closed, a solenoid winding surrounding the cylinder, an armature within the cylinder, a plunger connected to the armature and located between the armature and the closed end of the cylinder to serve as a dashpot, said armature having grooves extending in direction of its motion and ball bearings in said grooves cooperative with the cylinder wall, switch mechanism controlled by the plunger and means for variably energizing the solenoid winding to control the position of the armature.

19. In combination, a pivoted support, a contact carried thereby, a cooperating switch arm carried by the support and movable therewith, an actuator movable in a straight line, a self-aligning connection between the actuator and switch arm, the actuator serving to move the switch arm into engagement with said contact to close an electric circuit, an electrical device controlled by said circuit and connected to said support to move the same in a direction to separate the switch arm and contact, and an instrumentality to be controlled connected to said device.

20. In combination, a pivoted support, a pair of spaced contacts carried thereby, a flexible switch arm cooperable with said contacts and carried by said support, a plunger for moving said switch arm into engagement with one or the other of said contacts to complete a first or second electric circuit, a self-aligning connection between said plunger and switch arm, means in control of said plunger, and reversible motor means controlled by said circuits and connected to said support for moving the same in a direction to interrupt the circuit causing such movement of the support.

21. In combination, a member to be controlled, reversible motor means in control thereof, reversing switching means comprising a pivoted device having a pair of contacts and a contact arm device alternatively engageable therewith, means for positioning one of said devices in accordance with the position it is desired to have the controlled member assume whereby the reversing switching means is operated to cause proper energization of the reversible motor means, an operator controlled by the reversible motor means, a crank arm adjustable on said operator for de-energizing the reversible motor means when the controlled member has been moved to the desired position by the reversible motor means and limit switch means controlled by said operator for limiting the extreme movements of said reversible motor means.

LEWIS L. CUNNINGHAM.